Patented Sept. 13, 1932

1,877,062

UNITED STATES PATENT OFFICE

FRED L. SCHUBRING, OF BARABOO, WISCONSIN

POWDER FOR PREVENTING BATTERY POST CORROSION

No Drawing. Application filed April 7, 1931. Serial No. 528,451.

This invention relates to a composition of matter for use on storage battery terminals to prevent corrosion and sulphation thereof.

A chemical action takes place in batteries, resulting in the generation of sulphuric acid gas which escapes from the battery and acts on the metal cables as well as the terminals and, as these are of copper, serves to disintegrate them, forming a deposit of sulphate of copper which adheres to the terminals, cables and metal parts, increasing the resistance and load on the battery and thus requiring frequent recharging.

Hitherto, to prevent this sulphation, various grease containing compounds have been used, and it is an object of the present invention to provide a powder devoid of grease and adapted to form a coating over the terminals and metal parts to neutralize the acid, disintegrate the deposits on the terminals and obstruct the escape of acid at the terminals.

Hitherto, foul smelling as well as metal containing ingredients, such as creosote in the former class and paint in the latter class, have been used as corrosion preventing compounds, and it is a further object of the present invention to provide a compound devoid of metal constituents, foul smelling ingredients and the like, the compound of the present invention being also adapted to form a somewhat elastic though impervious-to-moisture coating over the terminals and metal parts which will adhere intimately to the parts through the natural inherent adhesiveness of the compound.

The composition constructed in accordance with the present invention preferably consists of the following ingredients substantially in the portions stated, either by weight or measure.

Air slack lime _____ 7 parts
Baking soda _____ 2 parts
Borax _____ 1 part

These ingredients are all in powder form and, in preparing the product, the powders are thoroughly mixed together and then are ready for use.

The air slack lime provides an impervious-to-water compound. The borax coacts chemically with the air slack lime in maintaining the coating somewhat elastic and preventing the coating from getting hard and cracking under fluctuating winter and summer temperatures, as well as motor and battery temperatures. The borax coacts chemically also with the air slack lime in imparting adhesiveness to the coating so that the product exhibits a natural adhesiveness sufficient to adhere to the exposed metal surfaces wherever applied and conform intimately to the contour of such metal surfaces so as to seal crevices and the like and prevent the escape of sulphuric acid gas from the battery around the terminals.

In use, the compound, as above stated, forms a coating for the exposed metal surfaces and maintains the same dry throughout the life of the battery.

Having thus described the invention, I claim:

A composition of matter for use in the treatment of battery terminals which includes seven parts air slack lime, two parts baking soda, and one part borax.

In testimony whereof I affix my signature.

FRED L. SCHUBRING. [L. S.]